United States Patent
Mary et al.

(10) Patent No.: US 10,915,378 B1
(45) Date of Patent: Feb. 9, 2021

(54) OPEN DISCOVERY SERVICE

(71) Applicant: SAP SE, Walldorf (DE)

(72) Inventors: Divya Mary, Walldorf (DE);
Harshavardhan Jegadeesan, Leiman (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/667,185

(22) Filed: Oct. 29, 2019

(51) Int. Cl.
*G06F 9/54* (2006.01)
*G06F 9/445* (2018.01)

(52) U.S. Cl.
CPC ............ *G06F 9/54* (2013.01); *G06F 9/44526* (2013.01)

(58) Field of Classification Search
CPC .................................. G06F 9/541; G06F 9/542
USPC ................................................. 719/318, 328
See application file for complete search history.

(56) References Cited

U.S. PATENT DOCUMENTS

| | | | | |
|---|---|---|---|---|
| 8,549,471 B2* | 10/2013 | Jung | .......................... | G06F 9/44 717/106 |
| 8,707,276 B2* | 4/2014 | Hill | .......................... | G06F 8/70 717/135 |
| 9,037,525 B2 | 5/2015 | Kiselbach et al. | | |
| 9,165,049 B2 | 10/2015 | Kiselbach et al. | | |
| 9,338,175 B1* | 5/2016 | Ramos | ............... | H04L 63/1408 |
| 9,846,730 B2 | 12/2017 | Nigam et al. | | |
| 10,387,145 B1* | 8/2019 | Bahrami | ................. | G06F 9/541 |
| 2008/0162664 A1 | 7/2008 | Jegadeesan | | |
| 2014/0324497 A1 | 10/2014 | Verma et al. | | |

* cited by examiner

*Primary Examiner* — Andy Ho
(74) *Attorney, Agent, or Firm* — Fish & Richardson P.C.

(57) ABSTRACT

The disclosure generally describes methods, software, and systems for using open APIs. API and event information is received from plural API providers. The API and event information for each API provider is received in a format specific to the API provider. An open API format version of the API and event information is created for the API and event information of each API provider. The open API format version is stored in an open API format that provides a common ontology for expressing information about APIs and events available from the plural API providers. The open API format version of the API and event information is published.

20 Claims, 10 Drawing Sheets

OPEN DISCOVERY SERVICE

BACKGROUND

The present disclosure relates to discovering application programming interfaces (APIs). APIs provide interfaces that can be used in computer applications to gain access to other systems. The interfaces can be implemented, for example, as method calls, procedure calls, or function calls. A set of APIs can serve as a collection of building blocks for software engineers to access various resources. The APIs can provide access, for example, to databases, web resources, operating system resources, software packages, and hardware resources. APIs may follow many different types of communication protocols, each defining a set of input and output parameters for the API.

SUMMARY

This disclosure generally describes computer-implemented methods, software, and systems for discovering, representing, and exposing various types of application programming interfaces (APIs). One computer-implemented method includes: receiving API and event information from plural API providers, wherein the API and event information for each API provider is received in a format specific to the API provider; creating, for the API and event information of each API provider, an open API format version of the API and event information, the open API format version stored in an open API format, wherein the open API format provides a common ontology for expressing information about APIs and events available from the plural API providers; and publishing the open API format version of the API and event information.

The foregoing and other implementations can each optionally include one or more of the following features, alone or in combination. In particular, one implementation can include all the following features:

In a first aspect, combinable with any of the previous aspects, wherein receiving the API and event information from an API provider comprises receiving the API and event information directly from the API provider.

In a second aspect, combinable with any of the previous aspects, wherein receiving the API and event information from an API provider comprises mechanically discovering the API and event information at a source associated with the API provider.

In a third aspect, combinable with any of the previous aspects, the method further comprising: providing, for presentation to a user, an open API format catalog; receiving, from the user, commands to search, discover, explore, and consume the open API format version of the API and event information; and providing, responsive to the commands, the open API format version of the API and event information.

In a fourth aspect, combinable with any of the previous aspects, the method further comprising automatically incorporating, into computer code controlled by the user, code implementing a call to user-selected API and event information, wherein the incorporated code is in the format specific to the API provider.

In a fifth aspect, combinable with any of the previous aspects, the method further comprising representing, using packages, the open API format version of the API and event information.

In a sixth aspect, combinable with any of the previous aspects, the method further comprising representing information associated with aggregate ratings, provider, tags, and actions as components accessible to the packages.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for discovering, representing, and exposing various types of application programming interfaces (APIs). APIs can include, for example, programming interfaces (including events) that serve as the building blocks to support extensions and integrations from a computer application in a third-party system or language. However, each source system that provides APIs may have different ways to expose the metadata associated with APIs and events. The metadata can define, for example, a library of available APIs and information about what each API does, how the API is called (and used), and what the expected results include. Information about APIs can be provided online, for example, as API libraries or catalogs. However, some systems may not have ways of exposing the metadata regarding their APIs. Without knowing which APIs and events are available from (or exposed by) a system, it can be difficult for software engineers, for example, to build extensions or integrations that use the APIs. Existing conventional approaches regarding publishing API metadata can rely on, for example, a) documentation b) custom API catalogs (for example, SAP's Gateway Catalog Service), and c) hypermedia APIs such as OData. Moreover, conventional approaches may not scale easily or may make it difficult to build extensions and integrations in a heterogeneous landscape. Additionally, some tools (such as web integrated development environment (WebIDE), Mobile Software Development Kit (SDK), Cloud Platform Integration, API Management, and Enterprise Messaging, do not have standard ways to discover APIs and events.

Systems that involve the use of APIs are typically heterogeneous. For example, the APIs may provide access to data processes and transactions that are distributed across multiple systems. Typically, APIs are exposed as standard APIs, as there is no common view of all the different APIs that are available from multiple systems. Further, there is no one standard way for API providers to expose their APIs, events, and connection information. The present disclosure provides techniques, including a common language, for open discovery of APIs. For example, the open discovery can standardize information and provide a uniform format used by tools that consume APIs to build applications or perform integration. This can be accomplished, for example, by collecting information about disparate APIs into a central location that presents the information in a standard format to API consumers. The information can be provided through an open discovery API, for example.

In some implementations, discovery of APIs and related connection information can be performed automatically by machine-driven processes. For example, automated processes can crawl the Internet to obtain information about APIs, the interfaces, and connection information. Information that is obtained can become part of an API catalog that provides information regarding APIs in a standardized way, making the information machine-readable and presentable to users. In some implementations, API providers can provide or publish information about their APIs for inclusion in the API catalog. Machine-readable formats can include, for example, JAVASCRIPT Object Notation (JSON).

In some implementations, the API catalog can be implemented as a centralized hub. The centralized hub can allow users to connect to different APIs that may have various (including proprietary) communication protocols. In some implementations, the API catalog can provide aggregated information so that users can obtain access to the APIs that may not be exposable in other ways. For example, some APIs may be in languages that some users are not able to understand. In this example, a common language provided by the API catalog.

The API catalog can provide the following advantages. The discovery and consumption of APIs can be faster than in convention systems in which many different protocols must be learned. Discovery by developer and machines can be supported. Developers can build client libraries and IDE plugins. API owners can more easily engage with and grow their API communities. API consumers can receive API and event definitions with information about the supported authentication and API lifecycle information (e.g., version, latest-version, software version, and deprecation policies). Public APIs can be exposed that do not require authentication to access resources. Taxonomy, interfaces, and services characteristics can be harmonized across various service providers. The harmonization can adhere to the representational state transfer (REST) harmonization guidelines from various groups.

Figure 1:
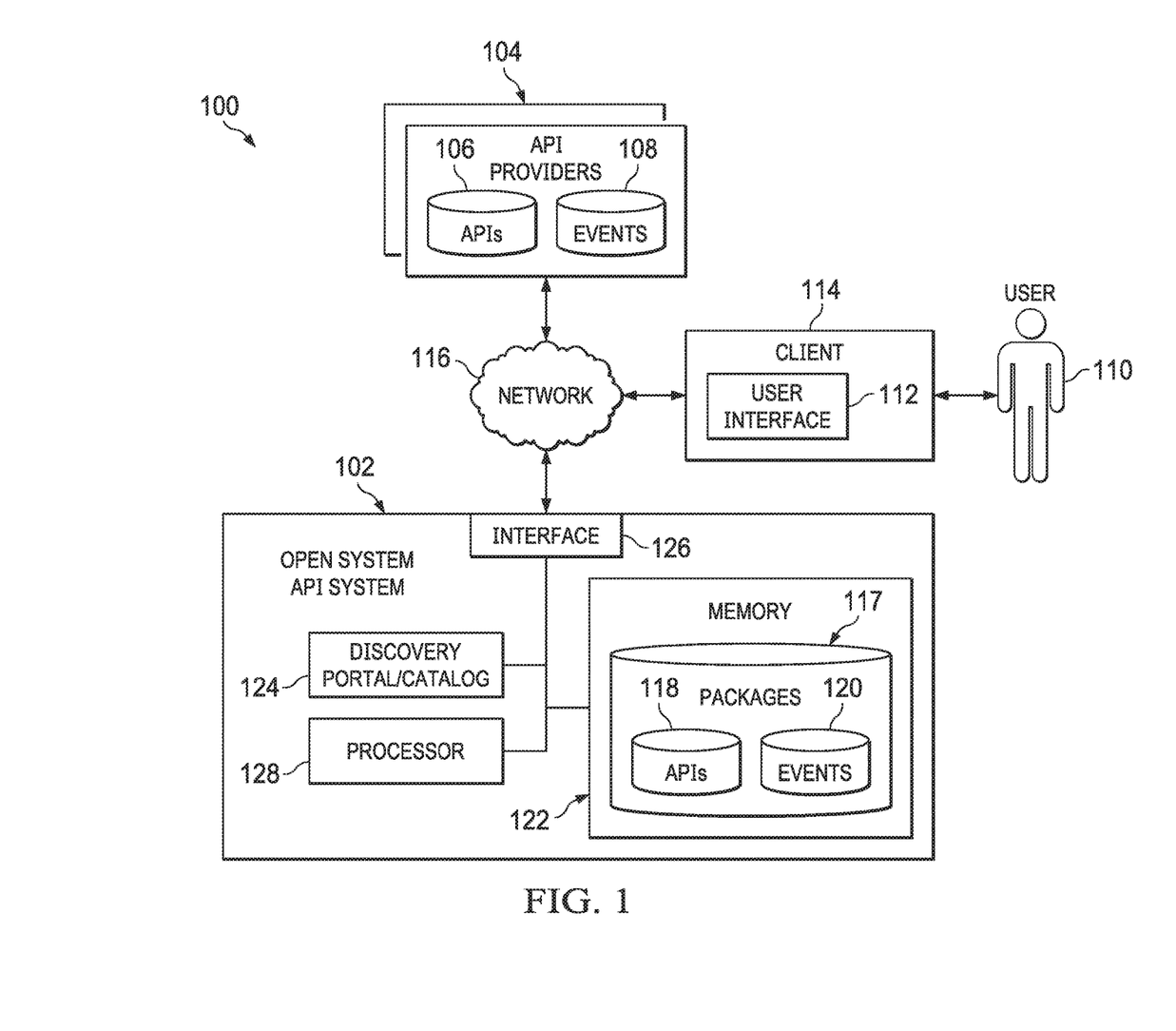
FIG. 1 is a block diagram of an example environment for providing open system application programming interfaces (APIs).

FIG. 1 is a block diagram of an example environment 100 for providing open system APIs. The environment 100 can support, search, discover, explore, and consume capabilities used by users 110 for accessing APIs 106 and events 108 provided by API providers 104. The users 110 can access the APIs and events using a user interface (UI) 112. The UI 112 can be displayed on a client 114 (for example, a workstation used by the user 110 for application programming). Communications from the client 114 can pass through a network 116 (for example, the Internet and optionally one or more other networks).

The open API system 102 can use packages 117 to represent the APIs 106 and the events 108 of the API providers 104. The packages 117 can include APIs 118 and events 120 that are in a language and format supporting discovery by the users 110. The packages 117 can be included in memory 122, for example, serving as an API catalog. A discovery portal/catalog function 124 of the open API system 102 can perform search, discover, explore, and consume functions needed by the users 110. An interface 126 of the open API system 102 can receive requests received through the network 116 and transmit results in response to the requests. The requests can include API and event information received from the API providers 104. The requests can also include requests received from users, including to search, discover, explore, and consume information related to APIs and events.

The UI 112 can be associated with one or more applications that run on a client 112 (e.g., a mobile device, laptop computer, or other computing device) to interact with the open API system 102. The network 116 can support communication among the components of the environment 100. A processor 128 can execute instructions of modules and other components of the open API system 102.

Figure 2:
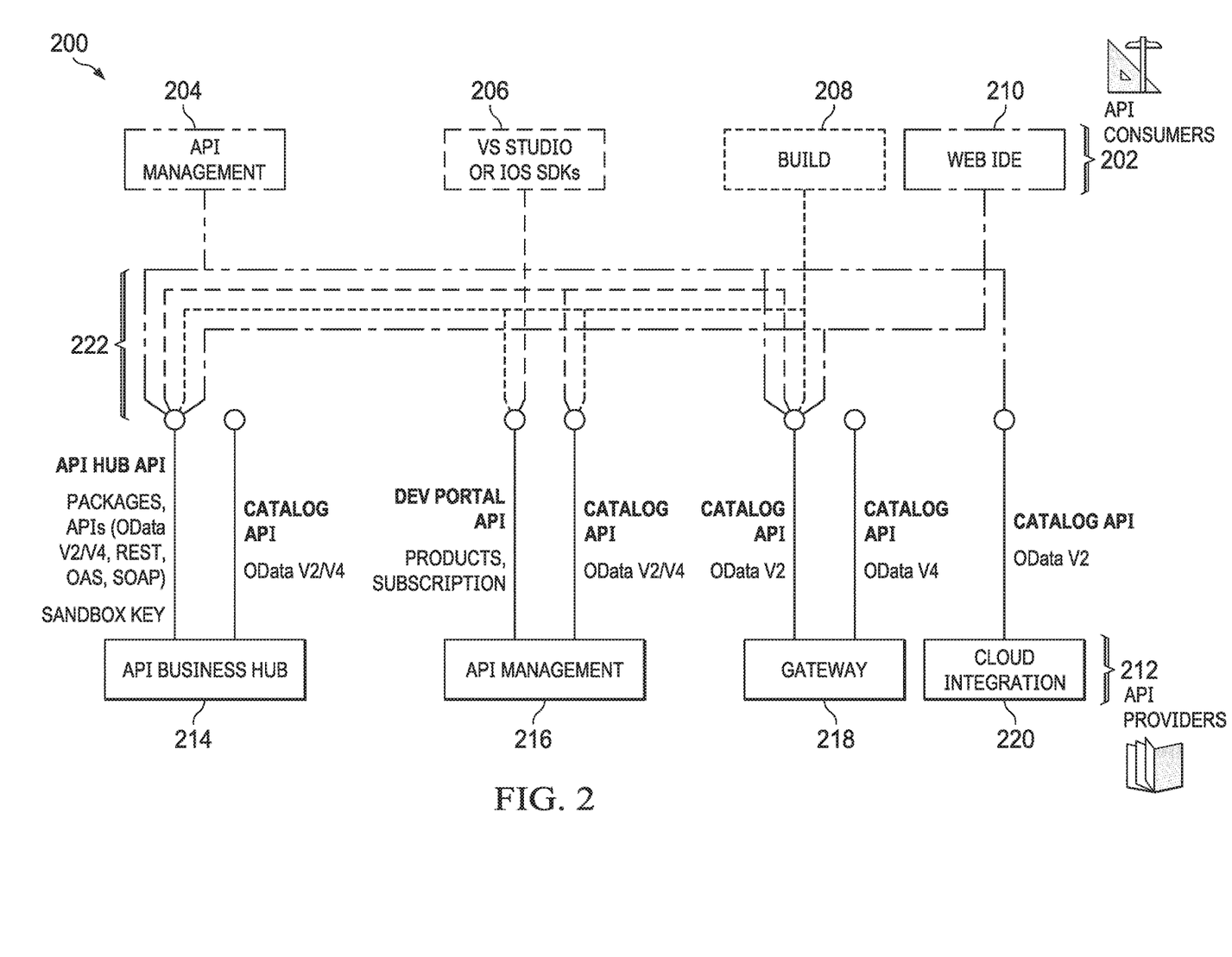
FIG. 2 is a block diagram of an example of a conventional consumer/provider architecture using multiple languages associated with specific API providers.

FIG. 2 is a block diagram of an example of a conventional consumer/provider architecture 200 using multiple languages associated with specific API providers. The conventional consumer/provider architecture 200 identifies how machines and users, for example, discover APIs in conventional systems. In this example, API providers can expose their APIs in advance, with each of the APIs having a different language and a different communication protocol. API consumers 202 can include various API consumption tools, for example, API management tools 204, visual studio (VS) and IOS (operating system) software development kits (SDKs) 206, build tools 208, and web integrated development environment (WebIDE) tools 210. API providers 212 can include, for example, API business hubs 214, API management providers 216, gateways 218, and cloud integration tools 220. The communication between the API consumers 202 and the API providers 212 can include several different communication protocols 222, including proprietary communication protocols. A goal and feature of the techniques of the present disclosure is to make discovery and use of the different communication protocols 222 a more simplified task for the API consumers 202. Further, another goal and feature of the present disclosure is to provide a common language that API consumers 202 can use for communicating with the API providers 212.

The API business hub 214 can include a hub API and a catalog API, providing access to packages, APIs (for example, Odata of different versions, Representational State Transfer (REST), SAS, Simple Object Access Protocol (SOAP), artifacts, proxies, and sandbox keys. The API management 216 can include a development (dev) portal API and a catalog API, providing access to products, subscriptions, and Odata of different versions. The gateways 218 can include catalog APIs that provide access to Odata of different versions. The cloud integration tools 220 can also include catalog APIs that provide access to Odata of different versions.

Figure 3:
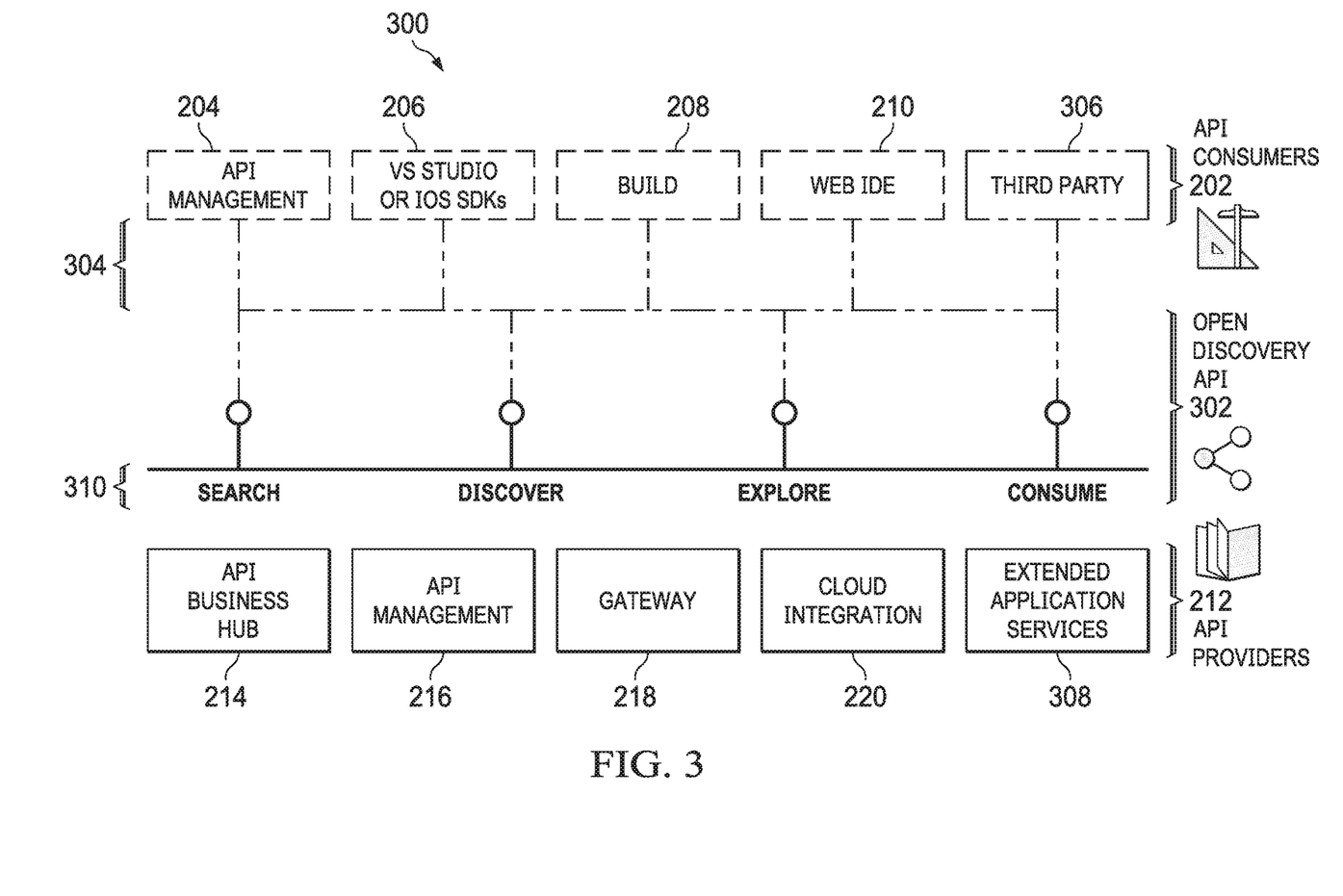
FIG. 3 is a block diagram of an example of an open consumer/provider architecture using open discovery API capabilities.

FIG. 3 is a block diagram of an example of an open consumer/provider architecture 300 using open discovery API capabilities. The open consumer/provider architecture 300 provides an improvement over the conventional consumer/provider architecture 200 because of the inclusion of an open discovery API 302. The open discovery API 302 provides a communication protocol 304 that is a simplified and standardize way for the API consumers 202 to discover and communicate with the API providers 212. This is an improvement over the several different communication protocols 222. The open consumer/provider architecture 300 also allows third-party consumers 306 to discover and communicate with the service providers 212. The open discovery API 302 also facilitates access to extended application services 308. The extended application services 308 can include, for example, an advanced model platform for the development and execution of micro-service oriented applications that take advantage of in-memory architecture and parallel execution capabilities provided by the extended application services 308. The open discovery API 302 can support developer and UI functions 310, including search, discover, explore, and consume capabilities.

Figure 4:
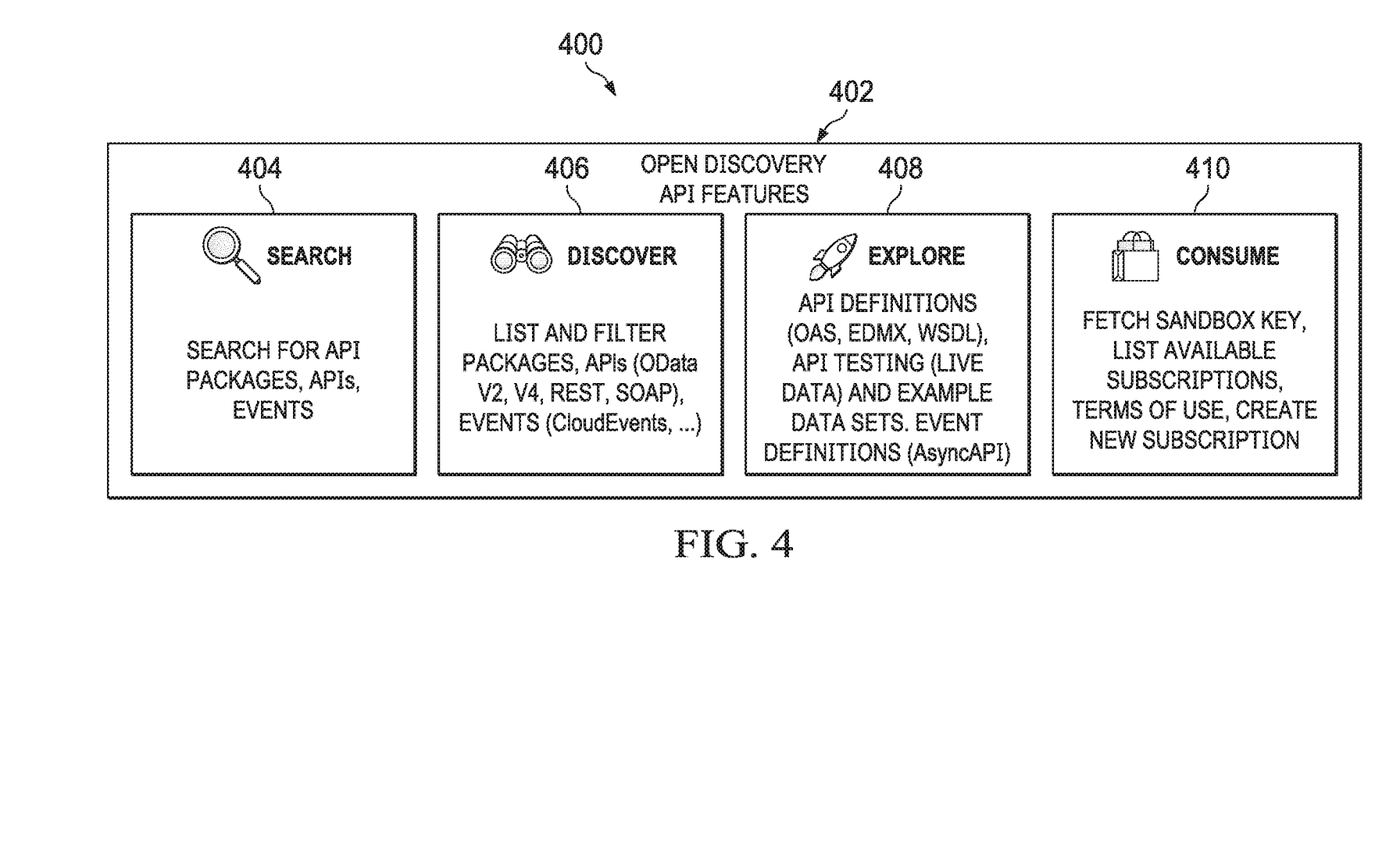
FIG. 4 is a block diagram showing examples of open discovery API features.

FIG. 4 is a block diagram showing examples of open discovery API features 402. The open discovery API features 402 can allow users (or other API consumers) to search for, select, and implement APIs that are available form API providers. For example, the open discovery API features 402 can implement the developer and UI functions 310. A search feature 404, for example, can allow users to search for API packages, APIs, and events, such as by name or type. A discover feature 406, for example, can allow a user to list and filter packages, APIs, and events (for example, cloud events) in various ways. An explore feature 408, for example, can allow a user to find API definitions (for example, Open API Standard (OAS), Entity Data Model Designer (EDMD) for edmx files, Web Services Description Language (WSDL), API testing and example data sets, and even definitions (for example AsyncAPI). The explore feature 408 can make use of information from packages that group APIs by various features. The explore feature 408 can allow users to search for APIs using keywords, filter results, and drill down to specific information for a given API. A consume feature 410, for example, can allow a user to fetch sandbox keys, list available subscriptions and terms of use, and create new subscriptions.

Figure 5:
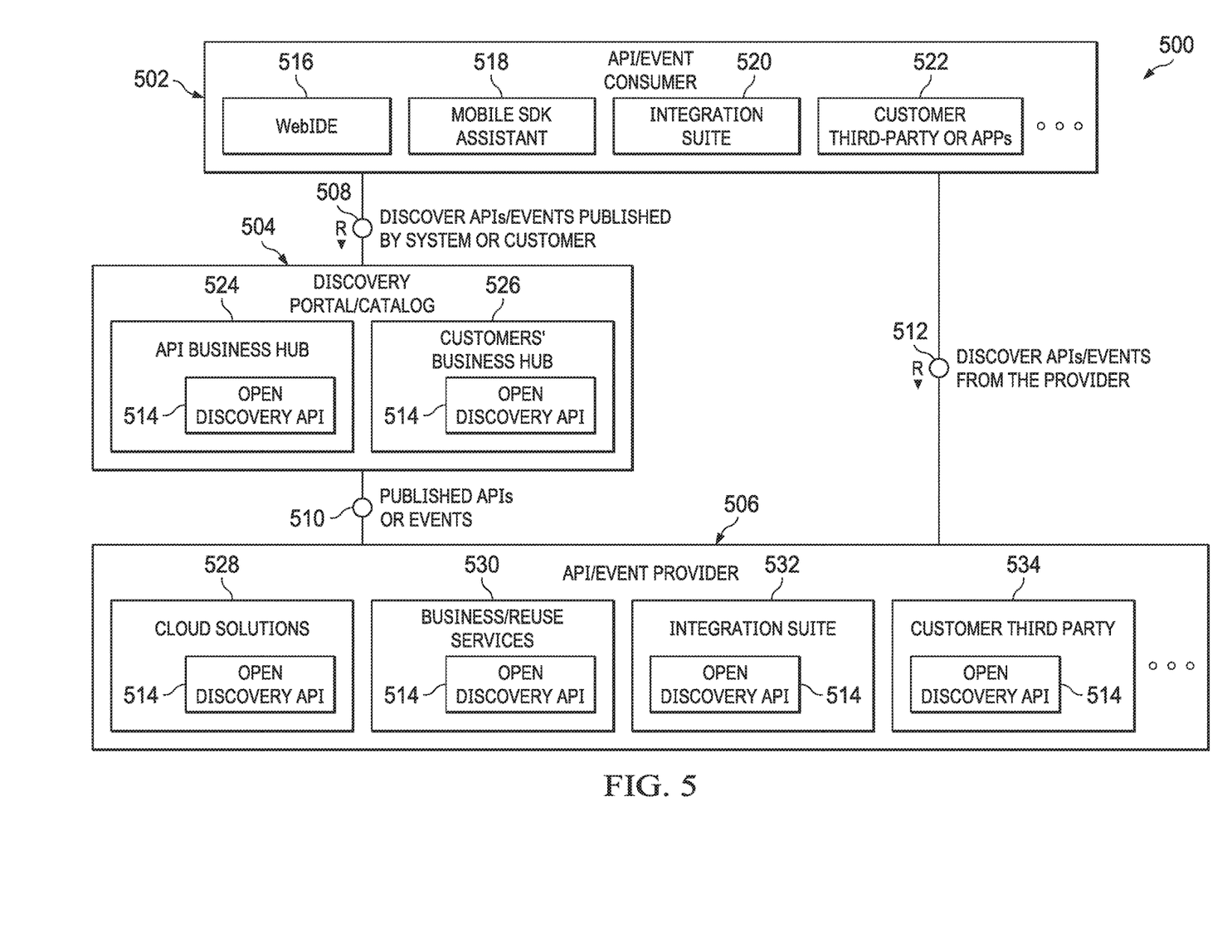
FIG. 5 is a block diagram showing an example of an architecture for open discovery API use.

FIG. 5 is a block diagram showing an example of an architecture 500 for open discovery API use. The architecture 500 can support API discovery and use in the cloud, for example, or in non-cloud networks. The architecture 500 can provide an open discoverable format used by API consumers to discover and use different kinds of APIs. Discovery can occur using the open discoverable format (for example, through a central repository), and subsequent use of the APIs can occur using the formats and communication protocols that are provided by the architecture 500. For example, the APIs of the different API providers can be exposed (for example, in a UI) in a common format that is easily digested by the user. Selection of an API by the user can cause an automatic import of the API-specific or API-proprietary format into the user's current context. For example, importing the API-specific or API-proprietary format can cause an addition to the user's application code, where the addition is a call to the API with the corresponding input and output parameters coded in the API-specific or API-proprietary format. Further, the security mechanisms that are needed to connect to the API can automatically be completed in the user's code. Security mechanisms can include, for example, API meta information such as security definitions and external links. In this way, the open API format aspects of the architecture 500 can initially serve as a bridge for the user, after which connections occur directly to the APIs of the API providers. After an initial handshake is accomplished using the connections, for example, the open API format can be skipped.

The architecture 500 includes API/event consumers 502 that can use a discovery portal/catalog 504 for access to API/event providers 506. Discovery 508 by the API/event consumers 502 that uses the discovery portal/catalog 504 can include, for example, discovery of APIs and events 510 published by system or by customers. The discovery also relies on published APIs and events published by the API/event providers 506. After discovery, API/event consumers 502 can access the API/event providers 506 directly. Discovery by the API/event consumers 502 can also include direct discovery 512 using APIs and events published by the API/event providers 506. Components of the API/event consumers 502, the discovery portal/catalog 504, and the API/event providers 506 include open discovery API 514 components that provide the open API capabilities.

The API/event consumers 502 can include, for example, WebIDE tools 516, mobile SDK assistant tools 518, integration suite tools 520, customer third-party tools or applications 522. The discovery portal/catalog 504 can include, for example, an API business hub 524 and customers' business hubs 526. The API/event providers 506 can include, for example, cloud solutions, 528, business re-use services 530, integration suites 532, and customer/third-party APIs and events 534.

Packages can be used to group APIs by tag, for example, by API type. Tags can include, for example, product, line of business, industry, and country.

Figure 6:
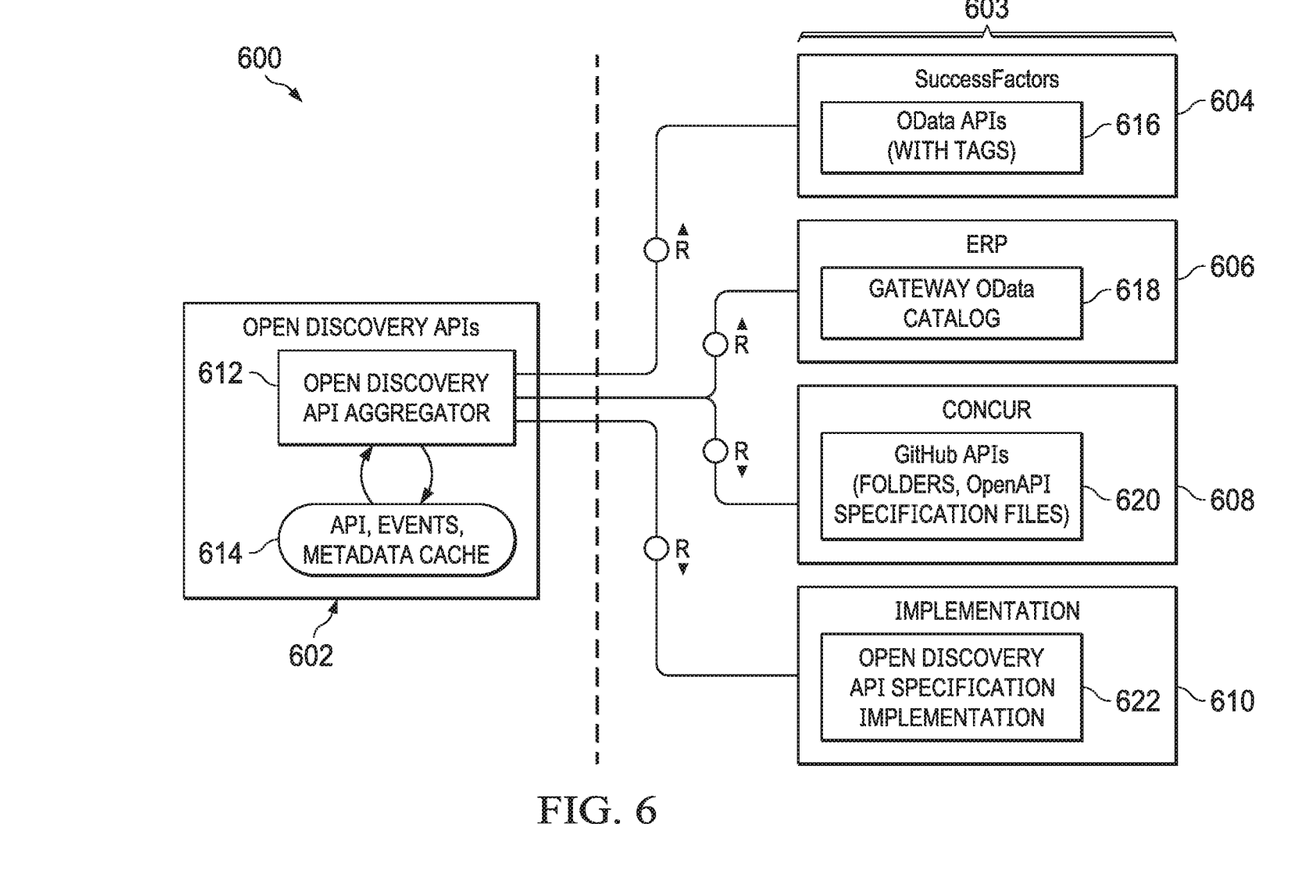
FIG. 6 is a block diagram showing an example of relationships between open discover APIs and conventional API components.

FIG. 6 is a block diagram showing an example of relationships 600 between open discovery APIs 602 and conventional API components 603. For example, the open discovery APIs 602 (see table 1) can provide a language implementation that supports discovery of the conventional API components 603. The relationships 600 depicted in FIG. 6 form a taxonomy and provide terminology of API-related components.

The open discovery APIs 602 use an open discovery API aggregator 612 that accesses an API, events, and metadata cache 614. The conventional API components 603 include success factors APIs 604, enterprise resource planning (ERP) APIs 606, Concur APIs 608, and implementation APIs 610. Success factors APIs 604 can include OData APIs with tags 616. ERP APIs 606 can use a gateway OData catalog 618. Concur APIs 608 (see table 2) can include GitHub APIs 620 (for example, including folders and open API specification files). Implementation APIs 610 can include open discover API specification implementation information 622.

The API components can define the mandatory and optional parameters for each of the APIs. The API components also provide human-readable information and definitions for each API including, for example, a names/titles, a description, ratings, terms of use, and links.

The mapping between an open discovery service layer and a native API implementation can depend on the target system. For example, the mapping can follow the following steps, based on the target system.

First, a system can expose its API information using metadata that is annotated with tags and secondary tags. For example, primary tags can be used to identify packages. The APIs can be grouped based on the primary tags and bundled within the API packages. Secondary tags can be used to identify the associated APIs within a given leading entity (for example, parent entity to child entity). This information can be used to generate the required metadata for the APIs.

Second, a cloud-based system can expose its public APIs as open APIs. For the open APIs, the cloud-based system can expose its own internal catalog to expose APIs and events. The mapping can be represented, for example, in Table 1:

TABLE 1

First API Mapping

| Open Discovery API | Gateway API |
|---|---|
| description | Description |
| title | Title |
| name | ID |
| version | TechnicalServiceVersion |
| apiDefinitions->url | MetadataUrl |
| apiDefinitions->type | Edmx (constant) |
| entryPoints->url | ServiceUrl |

Third, a concur system can place its public APIs in a folder (for example, a Github folder) for mapping public Github APIs. The Github folder can be mapped to packages. APIs can then be read from the Github folders and grouped accordingly. The mapping between open discovery API and OpenAPI files (for example, stored in Github) can be as follows in Table 2:

TABLE 2

Second API Mapping

| Open Discovery API | Concur System API |
|---|---|
| description | info->description |
| title | info->title |
| name | Filename of the Github file |
| Version | info->version |
| apiDefinitions->url | Github file location |
| apiDefinitions->type | oas-yaml |
| entryPoints->url | {scheme}://{basepath} |

Fourth, the backend can implement an open discovery API specification. For example, the specification can include a 1:1 mapping between the target APIs, events, and an open discovery API.

In consumer client implementations, since the open discovery API specification and the linked APIs definitions are machine readable (for example, in JSON/or Yet another markup language (YAML) format), the code generation to connect to the selected APIs can be as follows. First, a HyperText Transfer Protocol (HTTP) client can be dynamically created to connect to the uniform resource locator (URL) specified in entryPoints→url. Second, the API definitions end can be invoked to apiDefinitions→url to obtain the corresponding OpenAPI files. The files can be parsed to obtain information for the Resources, expected request payload, and response payloads.

Figure 7A:
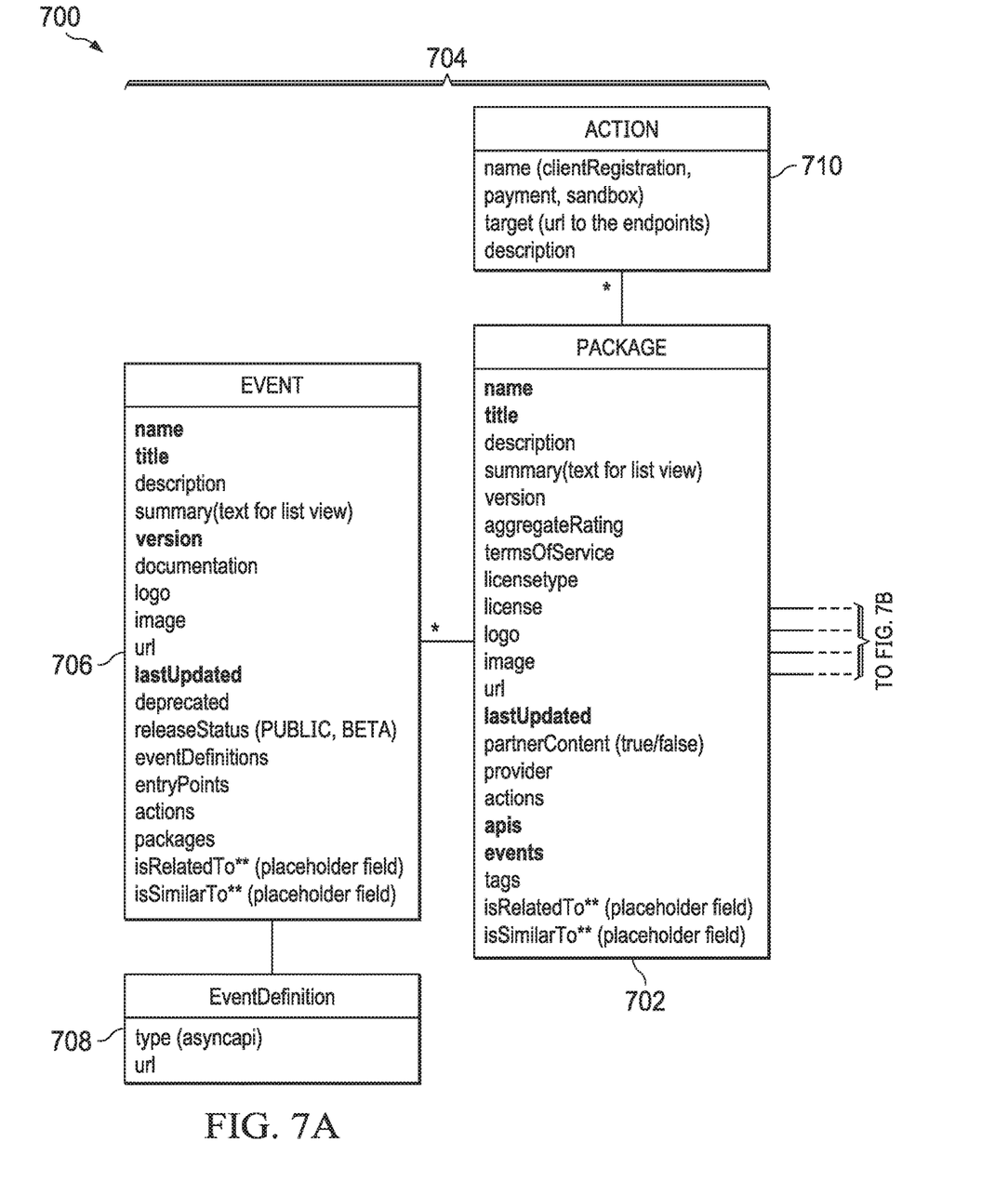
FIGS. 7A-7B collectively show a block diagram showing an example of relationships between open API format event-related components.
Figure 7B:
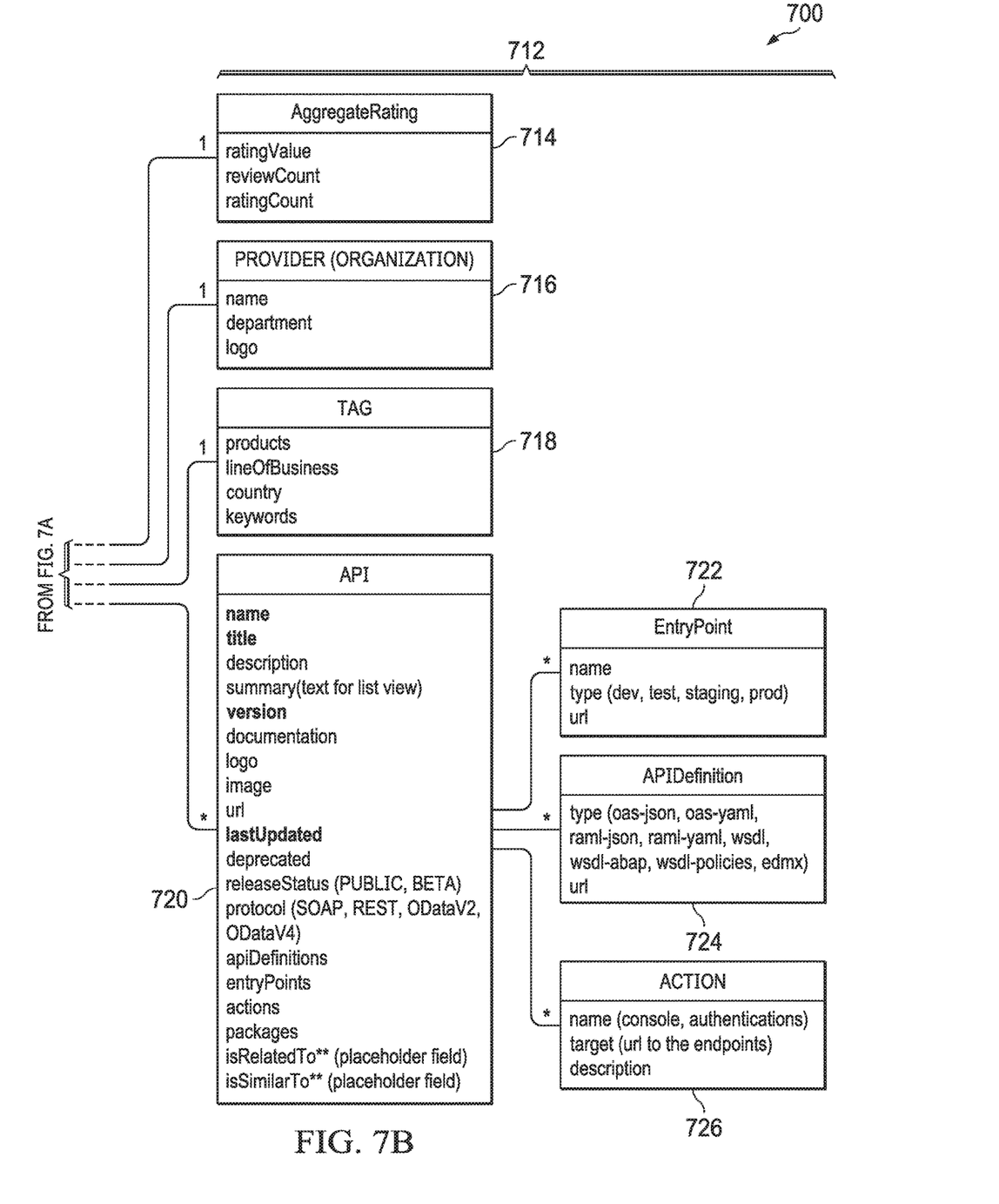

FIGS. 7A-7B collectively show a block diagram showing an example of relationships 700 between open API format event-related components. For example, events are organized into packages 702 which are part of open API format components 704. The open API format components 704 also include events 706, event definitions 708, and actions 710. The packages 702 can provide open API format access to conventional event-related components 712, including aggregate ratings 714, providers (or organizations) 716, tags 718, APIs 720, entry points 722, API definitions 724, and actions 726.

In some implementations, entry points for events can be implemented as packages. For example, packages can encapsulate events such as hiring an employee, onboarding the employee, employee training, employee advancement, and employee off-boarding/retirement. In another example, events related to purchase/sale can include sales orders, purchase orders, contract creation, and product/service delivery. Events can exist for creation, modification, and deletion of information.

Figure 8:
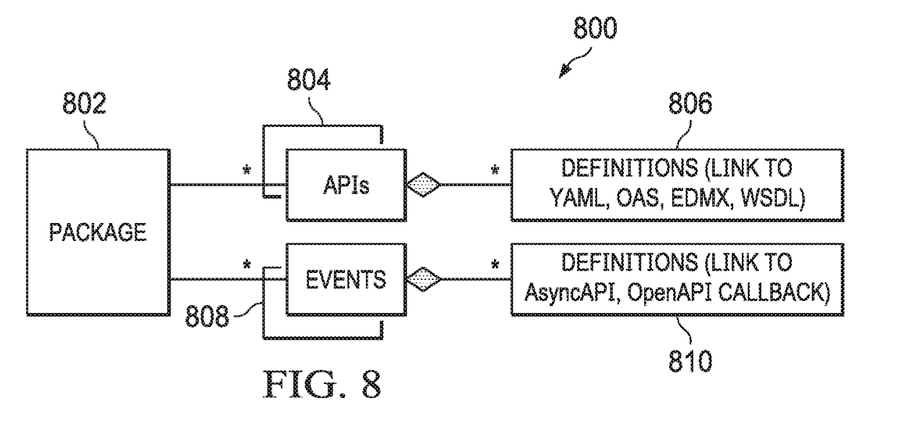
FIG. 8 is a block diagram showing an example of a hierarchy of an open API format system.

FIG. 8 is a block diagram showing an example of a hierarchy of an open API format system 800. Packages 802 provide access to conventional APIs 804 having API definitions 806. The packages 802 also provide access to conventional events 808 having event definitions 810.

Figure 9:
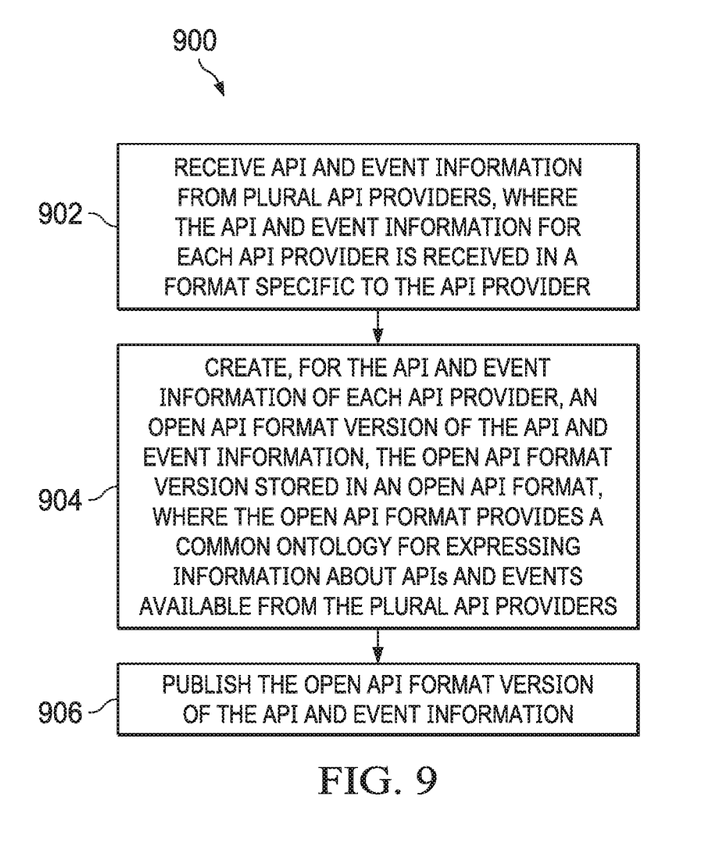
FIG. 9 is a flowchart of an example method for providing an open API system.

FIG. 9 is a flowchart of an example method 900 for providing an open API system. Method 900 can be performed by the open API system 102, for example. For clarity of presentation, the description that follows generally describes method 900 in the context of FIGS. 1-8.

At 902, API and event information is received from plural API providers. The API and event information for each API provider is received in a format specific to the API provider. For example, the open API system 102 can receive AIPI and event information from an API provider 104. In some implementations, receiving the API and event information from an API provider can include receiving the API and event information directly from the API provider. In some implementations, receiving the API and event information from an API provider comprises mechanically discovering the API and event information at a source associated with the API provider.

At 904, an open API format version of the API and event information is created for the API and event information of each API provider. The open API format version can be stored, for example, in an open API format that provides a common ontology for expressing information about APIs and events available from the plural API providers.

At 906, the open API format version of the API and event information is published. For example, the open API system 102 can publish information available to users 110.

In some implementations, method 900 further includes steps for providing a catalog of the APIs to a user. For example, an open API format catalog can be provided for presentation to a user, such as in a user interface. Commands to search, discover, explore, and consume the open API format version of the API and event information can be receiving, from the user. The open API format version of the API and event information can be provided responsive to the commands.

In some implementations, method 900 further includes automatically incorporating, into computer code controlled by the user, code implementing a call to user-selected API and event information, wherein the incorporated code is in the format specific to the API provider. For example, the system can automatically embed API calls in source code being developed by and under the control of the user.

In some implementations, method 900 further includes representing, using packages, the open API format version of the API and event information. For example, the user can view open API information in package form.

In some implementations, method 900 further includes representing information associated with aggregate ratings, provider, tags, and actions as components accessible to the packages. For example, information that is represented and that can be presented to the user can include components that are shown in FIGS. 6 and 7.

Figure 10:
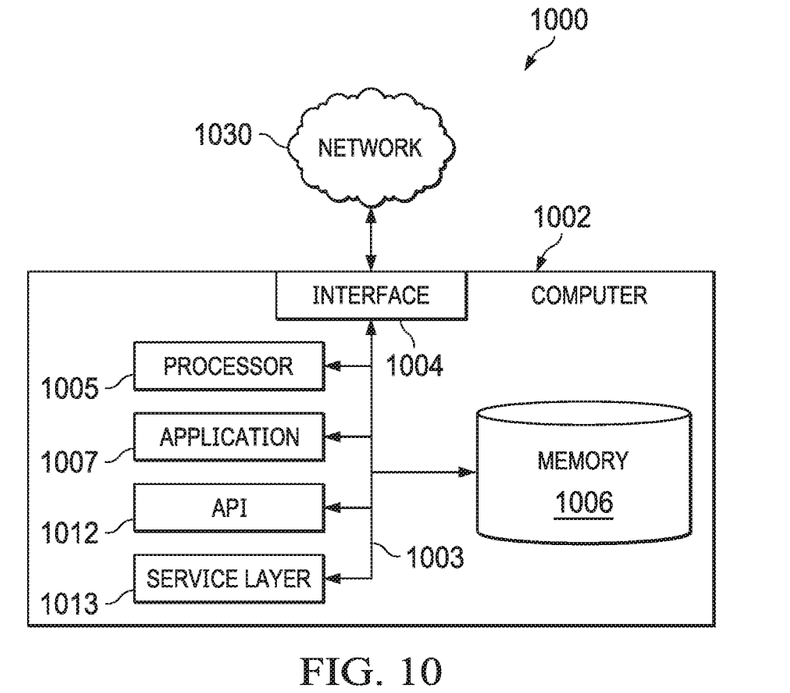
FIG. 10 is a block diagram of an exemplary computer system used to provide computational functionalities associated with described algorithms, methods, functions, processes, flows, and procedures as described in the instant disclosure.

FIG. 10 is a block diagram of an exemplary computer system 1000 used to provide computational functionalities associated with described algorithms, methods, functions, processes, flows, and procedures as described in the instant disclosure.

The illustrated computer 1002 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1002 may comprise a computer that includes an input device, such as a keypad, keyboard, touch screen, or other device that can accept user information, and an output device that conveys information associated with the operation of the computer 1002, including digital data, visual, or audio information (or a combination of information), or a graphical user interface (GUI).

The computer 1002 can serve in a role as a client, network component, a server, a database or other persistency, or any other component (or a combination of roles) of a computer system for performing the subject matter described in the instant disclosure. The illustrated computer 1002 is communicably coupled with a network 1030. In some implementations, one or more components of the computer 1002 may be configured to operate within environments, including cloud-computing-based, local, global, or other environment (or a combination of environments).

At a high level, the computer 1002 is an electronic computing device operable to receive, transmit, process, store, or manage data and information associated with the described subject matter. According to some implementations, the computer 1002 may also include or be communicably coupled with an application server, e-mail server, web server, caching server, streaming data server, business intelligence (BI) server, or other server (or a combination of servers).

The computer 1002 can receive requests over network 1030 from a client application (for example, executing on another computer 1002) and responding to the received requests by processing the said requests in an appropriate software application. In addition, requests may also be sent to the computer 1002 from internal users (for example, from a command console or by other appropriate access method), external or third-parties, other automated applications, as well as any other appropriate entities, individuals, systems, or computers.

Each of the components of the computer 1002 can communicate using a system bus 1003. In some implementations, any or all of the components of the computer 1002, both hardware or software (or a combination of hardware and software), may interface with each other or the interface 1004 (or a combination of both) over the system bus 1003 using an API 1012 or a service layer 1013 (or a combination of the API 1012 and service layer 1013). The API 1012 may include specifications for routines, data structures, and object classes. The API 1012 may be either computer-language independent or dependent and refer to a complete interface, a single function, or even a set of APIs. The service layer 1013 provides software services to the computer 1002 or other components (whether or not illustrated) that are communicably coupled to the computer 1002. The functionality of the computer 1002 may be accessible for all service consumers using this service layer. Software services, such as those provided by the service layer 1013, provide reusable, defined business functionalities through a defined interface. For example, the interface may be software written in JAVA, C++, or other suitable language providing data in extensible markup language (XML) format or other suitable format. While illustrated as an integrated component of the computer 1002, alternative implementations may illustrate the API 1012 or the service layer 1013 as stand-alone components in relation to other components of the computer 1002 or other components (whether or not illustrated) that are communicably coupled to the computer 1002. Moreover, any or all parts of the API 1012 or the service layer 1013 may be implemented as child or sub-modules of another software module, enterprise application, or hardware module without departing from the scope of the instant disclosure.

The computer 1002 includes an interface 1004. Although illustrated as a single interface 1004 in FIG. 10, two or more interfaces 1004 may be used according to particular needs, desires, or particular implementations of the computer 1002. The interface 1004 is used by the computer 1002 for communicating with other systems in a distributed environment that are connected to the network 1030 (whether illustrated or not). Generally, the interface 1004 comprises logic encoded in software or hardware (or a combination of software and hardware) and operable to communicate with the network 1030. More specifically, the interface 1004 may comprise software supporting one or more communication protocols associated with communications such that the network 1030 or interface's hardware is operable to communicate physical signals within and outside of the illustrated computer 1002.

The computer 1002 includes a processor 1005. Although illustrated as a single processor 1005 in FIG. 10, two or more processors may be used according to particular needs, desires, or particular implementations of the computer 1002. Generally, the processor 1005 executes instructions and manipulates data to perform the operations of the computer 1002 and any algorithms, methods, functions, processes, flows, and procedures as described in the instant disclosure.

The computer 1002 also includes a memory 1006 that holds data for the computer 1002 or other components (or a combination of both) that can be connected to the network 1030 (whether illustrated or not). For example, memory 1006 can be a database storing data consistent with this disclosure. Although illustrated as a single memory 1006 in FIG. 10, two or more memories may be used according to particular needs, desires, or particular implementations of the computer 1002 and the described functionality. While memory 1006 is illustrated as an integral component of the computer 1002, in alternative implementations, memory 1006 can be external to the computer 1002.

The application 1007 is an algorithmic software engine providing functionality according to particular needs, desires, or particular implementations of the computer 1002, particularly with respect to functionality described in this disclosure. For example, application 1007 can serve as one or more components, modules, applications, etc. Further, although illustrated as a single application 1007, the application 1007 may be implemented as multiple applications 1007 on the computer 1002. In addition, although illustrated as integral to the computer 1002, in alternative implementations, the application 1007 can be external to the computer 1002. The application can be deployed, for example, as a Cloud solution, an on-premises solution, or a combination.

There may be any number of computers 1002 associated with, or external to, a computer system containing computer 1002, each computer 1002 communicating over network 1030. Further, the term "client," "user," and other appropriate terminology may be used interchangeably as appropriate without departing from the scope of this disclosure. Moreover, this disclosure contemplates that many users may use one computer 1002, or that one user may use multiple computers 1002.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for providing open application programming interface (API) format information, comprising:

receiving API and event information from a plurality of API providers for a plurality of APIs exposed by a corresponding plurality of system, wherein a first API and event information for a first API from the plurality of APIs is received in a format specific to a corresponding first API provider from a plurality of API providers, and wherein each API of the plurality of APIs has a different language and a different communication protocol associated with a relevant API provider;

creating, based on the API and event information of the plurality of APIs, a plurality of open API format versions for the plurality of APIs, wherein the plurality of open API format versions are stored in an open API format that provides a standardized communication protocol for API consumers to discover and communicate with the different plurality of APIs of the plurality of API providers, wherein the open API format provides a common ontology for expressing information about APIs and events available from the plurality of APIs of the plurality of API providers, wherein the plurality of open API format versions are provided in a language implementation that support discovery of API components for the plurality of APIs;

publishing, at a discovery catalog for access to the plurality of APIs of the plurality of API providers, the plurality of open API format versions of the API and event information for the plurality of APIs for consuming by a user when calling at least one of the plurality of APIs;

receiving a user interaction selecting an API from the plurality of APIs that are exposed in a user interface associated with the discovery catalog, wherein the plurality of APIs are exposed in the plurality of open API format versions, and wherein the selected API is for consumption by a user application; and in response to the selection, automatically providing additional code implementing a call to the selected API, wherein the provided additional code is for incorporating in application code of the user application, wherein the additional code is in an API format that is specific to the API provider of the selected API, and wherein the call includes corresponding input and output parameters coded in the API format.

2. The computer-implemented method of claim 1, wherein receiving the API and event information from the plurality of API providers comprises receiving the API and event information directly from the API provider.

3. The computer-implemented method of claim 1, wherein receiving the API and event information from the plurality of API providers comprises mechanically discovering the API and event information at a source associated with a first API provided from the plurality of API providers.

4. The computer-implemented method of claim 1, further comprising:
providing, for presentation to the user, the discovery catalog as an open API format catalog;
receiving, from the user, commands to search, discover, explore, and consume an open API format version of an API from the plurality of APIs; and
providing, responsive to the commands, the open API format version of the API.

5. The computer-implemented method of claim 4, further comprising:
automatically incorporating, into the application code controlled by the user, the provided additional code implementing the call to the selected API.

6. The computer-implemented method of claim 1, further comprising:
representing, using packages, the plurality of open API format versions of the APIs.

7. The computer-implemented method of claim 6, further comprising representing information associated with aggregate ratings, provider, tags, and actions as the API components accessible to the packages.

8. A system comprising:
memory storing application programming interface (API) information; and
a server performing operations comprising:
receiving API and event information from a plurality of API providers for a plurality of APIs exposed by a corresponding plurality of system, wherein a first API and event information for a first API from the plurality of APIs is received in a format specific to a corresponding first API provider from a plurality of API providers, and wherein each API of the plurality of APIs has a different language and a different communication protocol associated with a relevant API provider;
creating, based on the API and event information of the plurality of APIs, a plurality of open API format versions for the plurality of APIs, wherein the plurality of open API format versions are stored in an open API format that provides a standardized communication protocol for API consumers to discover and communicate with the different plurality of APIs of the plurality of API providers, wherein the open API format provides a common ontology for expressing information about APIs and events available from the plurality of APIs of the plurality of API providers, wherein the plurality of open API format versions are provided in a language implementation that support discovery of API components for the plurality of APIs;
publishing, at a discovery catalog for access to the plurality of APIs of the plurality of API providers, the plurality of open API format versions of the API and event information for the plurality of APIs for consuming by a user when calling at least one of the plurality of APIs;
receiving a user interaction selecting an API from the plurality of APIs that are exposed in a user interface associated with the discovery catalog, wherein the plurality of APIs are exposed in the plurality of open API format versions, and wherein the selected API is for consumption by a user application; and
in response to the selection, automatically providing additional code implementing a call to the selected API, wherein the provided additional code is for incorporating in application code of the user application, wherein the additional code is in an API format that is specific to the API provider of the selected API, and wherein the call includes corresponding input and output parameters coded in the API format.

9. The system of claim 8, wherein receiving the API and event information from the plurality of API providers comprises receiving the API and event information directly from the API provider.

10. The system of claim 8, wherein receiving the API and event information from the plurality of API providers comprises mechanically discovering the API and event information at a source associated with a first API provided from the plurality of API providers.

11. The system of claim 8, the operations further comprising:
providing, for presentation to the user, the discovery catalog as an open API format catalog;
receiving, from the user, commands to search, discover, explore, and consume an open API format version of an API from the plurality of APIs; and
providing, responsive to the commands, the open API format version of the API.

12. The system of claim 11, the operations further comprising:
automatically incorporating, into the application code controlled by the user, the provided additional code implementing the call to the selected API.

13. The system of claim 8, the operations further comprising:
representing, using packages, the plurality of open API format versions of the APIs.

14. The system of claim 13, the operations further comprising representing information associated with aggregate ratings, provider, tags, and actions as the API components accessible to the packages.

15. A non-transitory computer-readable media encoded with a computer program, the computer program comprising instructions that when executed by one or more computers cause the one or more computers to perform operations comprising:
receiving API and event information from a plurality of API providers for a plurality of APIs exposed by a corresponding plurality of system, wherein a first API and event information for a first API from the plurality of APIs is received in a format specific to a corresponding first API provider from a plurality of API providers, and wherein each API of the plurality of APIs has a different language and a different communication protocol associated with a relevant API provider;

creating, based on the API and event information of the plurality of APIs, a plurality of open API format versions for the plurality of APIs, wherein the plurality of open API format versions are stored in an open API format that provides a standardized communication protocol for API consumers to discover and communicate with the different plurality of APIs of the plurality of API providers, wherein the open API format provides a common ontology for expressing information about APIs and events available from the plurality of APIs of the plurality of API providers, wherein the plurality of open API format versions are provided in a language implementation that support discovery of API components for the plurality of APIs;

publishing, at a discovery catalog for access to the plurality of APIs of the plurality of API providers, the plurality of open API format versions of the API and event information for the plurality of APIs for consuming by a user when calling at least one of the plurality of APIs;

receiving a user interaction selecting an API from the plurality of APIs that are exposed in a user interface associated with the discovery catalog, wherein the plurality of APIs are exposed in the plurality of open API format versions, and wherein the selected API is for consumption by a user application; and in response to the selection, automatically providing additional code implementing a call to the selected API, wherein the provided additional code is for incorporating in application code of the user application, wherein the additional code is in an API format that is specific to the API provider of the selected API, and wherein the call includes corresponding input and output parameters coded in the API format.

16. The non-transitory computer-readable media of claim 15, wherein receiving the API and event information from the plurality of API providers comprises receiving the API and event information directly from the API provider.

17. The non-transitory computer-readable media of claim 15, wherein receiving the API and event information from the plurality of API providers comprises mechanically discovering the API and event information at a source associated with a first API provided from the plurality of API providers.

18. The non-transitory computer-readable media of claim 15, the operations further comprising:
providing, for presentation to the user, the discovery catalog as an open API format catalog;
receiving, from the user, commands to search, discover, explore, and consume an open API format version of an API from the plurality of APIs; and
providing, responsive to the commands, the open API format version of the API.

19. The non-transitory computer-readable media of claim 18, the operations further comprising:
automatically incorporating, into the application code controlled by the user, the provided additional code implementing the call to the selected API.

20. The non-transitory computer-readable media of claim 15, the operations further comprising:
representing, using packages, the plurality of open API format versions of the APIs.

* * * * *